Patented Jan. 28, 1941

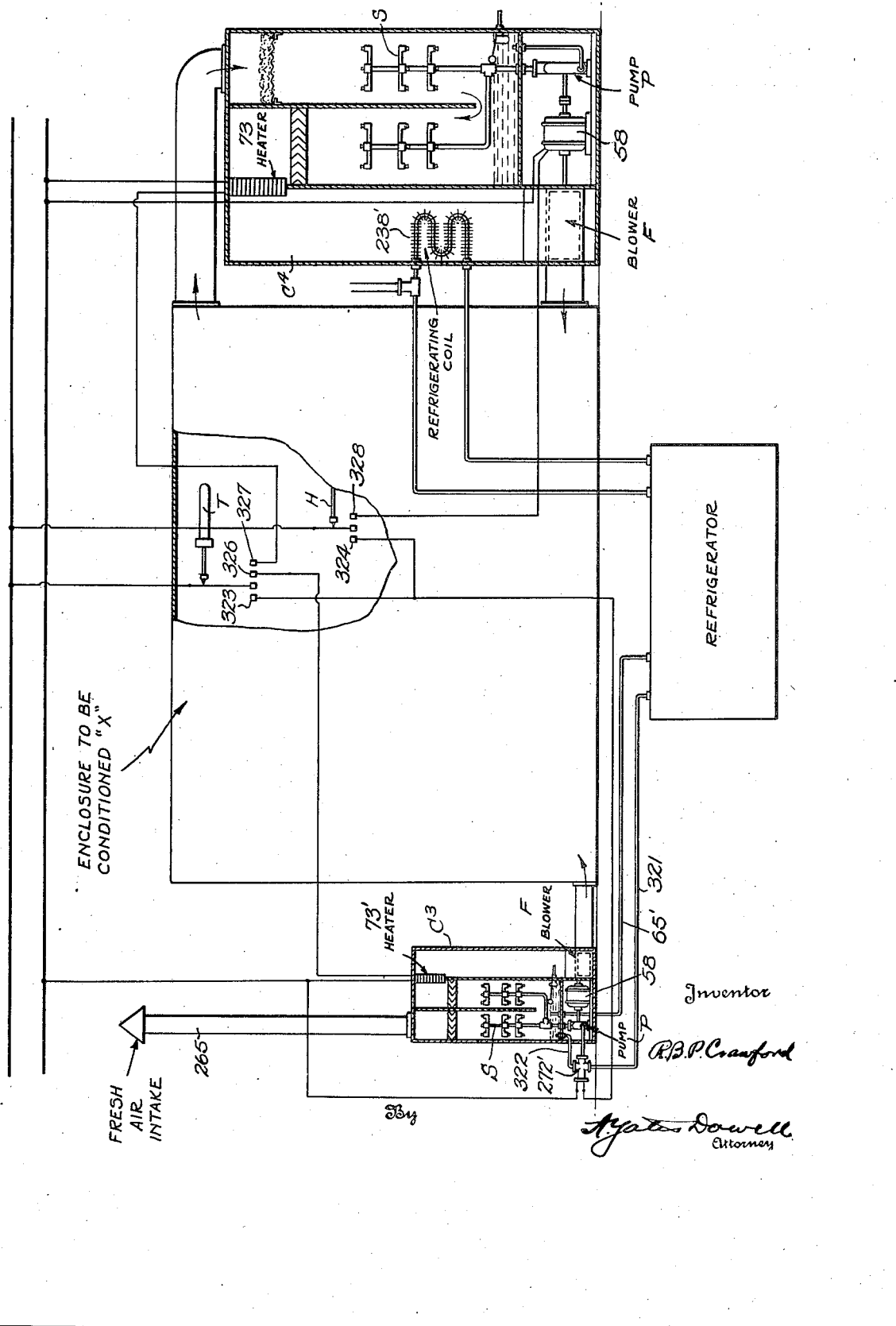

2,230,158

UNITED STATES PATENT OFFICE 2,230,158

METHOD OF INCUBATION

Robert B. P. Crawford, Washington, D. C., assignor to Frick Company, Waynesboro, Pa., a corporation of Pennsylvania Original application July 5, 1929, Serial No. 375,952. Divided and this application July 17, 1937, Serial No. 154,315

2 Claims. (Cl. 119—37)

This invention relates to incubating, hatching and brooding and more particularly to a method of incubation involving air-conditioning for maintaining the desired humidity and temperature conditions within an enclosure such as an incubator.

The invention contemplates the utilization of a plurality of air conditioning units in conjunction with an enclosure; for example, one of such units may be connected in a closed circuit with an enclosure, to be conditioned, and the other may be directly connected to the enclosure at one of its ends with its other end open to the atmosphere permitting the intake of fresh air to be conditioned for the enclosure. One of these units, for example, the one open to the atmosphere, may have associated therewith, a refrigerating system. This application is a division of my copending application 375,952 filed July 5, 1929, and granted on November 22, 1938 as Patent No. 2,137,996.

Eggs in their early stages of incubation require the supplying of an appreciable amount of heat thereto, and, hence, the air contacting with these eggs must be at a sufficiently high temperature to supply this heat. On the other hand, eggs in the advanced stage of incubation generate and emit heat, and care must be taken that the air contacting with these eggs does not allow them to become overheated. It will therefore be seen that the maintenance of the proper temperature is critical, where maximum incubating efficiency is desired, and the circulation of this air is also important for the avoidance of "hot spots" in the incubating enclosure.

An object of the invention is to provide incubating and hatching apparatus which can be substantially closed to atmosphere and wherein substantially the same charge of air is recirculated continuously through the apparatus. In this continuously repeated cycle of circulation such volume of air is repeatedly reconditioned as to humidity and temperature.

It is an object of this invention to maintain within the enclosure of an incubator, a hatcher, or a brooder, desired temperature and humidity conditions.

It is the further object of the invention to maintain within the enclosure of an incubator or brooder temperature and humidity conditions lower than that obtainable by the use of water sprays alone.

It is another object to provide an air-conditioning system for use with the hatcher or incubator, including a refrigerating system.

Another object is to maintain, within the enclosure, a static pressure higher than atmospheric pressure so as to prevent infiltration of atmospheric conditions into the enclosure through any small openings, crevices, etc.

Other objects and the nature and advantages of the invention will be apparent from the following description taken in conjunction with the accompanying drawing, wherein the single figure is a diagrammatic view with parts broken away and parts in section illustrating one form of the invention.

Referring to the figure, a conditioning unit C3 is arranged to supply atmospheric air to the enclosure designated X. Such conditioning unit has an individual motor 58 and fan or blower F, the atmospheric air being drawn into the unit through the fresh air inlet duct 265 and being impelled into the enclosure by the fan F. The other conditioning unit, having closed circuit communication with the enclosure, is designated C4. The streams of air supplied by the respective conditioning units C3 and C4 may enter the enclosure X at remote points as shown in the drawing. The conditioning unit C3 is of relatively small capacity, ranging preferably between five per cent to twenty per cent of the capacity of the large unit C4. One of the important objects in employing the unit C3 to introduce atmospheric air into the enclosure is to maintain therein a static pressure higher than atmospheric pressure so as to prevent the infiltration of atmospheric conditions into the enclosure through any small openings, crevices, etc.

In fulfilling this purpose the unit C3 need not be of very large capacity and, hence, the operation of conditioning the relatively small volume of atmospheric air introduced through said unit does not require the use of large apparatus, nor does it require expensive, large capacity sources of heat or cold for conditioning this comparatively small volume of atmospheric air. A source of heat for the small unit C3 is represented by the heating element 73' electrically connected to be responsive to thermostatic control apparatus T, which in turn is responsive to the temperature within the enclosure. A source of cold may be provided in this conditioning unit in any one of several ways. For example, a cooling coil, such as is illustrated by the coil 238' in Fig. 1, may be interposed therein and arranged to have refrigerant or any other coolant circulated through said coil under the control of the temperature and humidity control devices to be presently described. In the arrangement illustrated, I have shown the conditioning unit C3 as being provided with spray apparatus S and the desired cooling effect is had by introducing relatively cold water to the spray system or otherwise reducing the temperature of the spray water. Where relatively cold water is adapted to be supplied to the spray apparatus, such is introduced into the spray circulation through a pipe 321 connecting with an automatic 3-way valve 272' which governs the source of the supply water fed to the inlet of the pump P. When this valve is in its normal position, water is drawn from the spray water tank of the unit through pipe 322 and passes through the automatic valve 272' to the inlet of the pump for projection from the spray nozzles. When the valve is energized in response to a temperature or humidity sensing instrument, the flow through the pipe 322 is cut off or restricted and relatively cold water is supplied to the pump through pipe 321. The overflow pipe 65' leads from the spray water tank back to the refrigerator coils or other cooling source from which the pipe 321 draws its supply.

The automatic valve 272' is electrically connected with contact 323 of the temperature control device T and is also connected with contact 324 of the humidity control device H, the latter being either a hygrostat, a dew point sensing instrument, or any other apparatus for sensing humidity.

The relatively large conditioning unit C4 may be of any suitable design, comprising primarily the fan or blower F, motor 58, pump P, and spray apparatus S. When this unit is operating, the fan or blower F circulates a relatively large volume of air from the enclosure X through said unit, such air being maintained in a closed circuit substantially out of contact with the atmosphere. The principal conditioning operation occurring in this large unit is that of saturating the air circulated therethrough, such being effected by a relatively intense spray discharge from the spray apparatus S. If desired, a heating operation may also occur in this large conditioning unit to supplement the action of the heater 73' in the small unit C3. To this end a heater 73 may be interposed in the large conditioning unit and electrically connected to respond to the temperature control apparatus T. The heater 73' in the small unit is connected with a contact 326 which is engaged by the main switch contact when the temperature within the enclosure falls below a predetermined point. Thus, the heater 73' is energized which results in the tempering of the atmospheric air entering the unit C3. If this is not adequate to bring the temperature within the enclosure back to its desired point, the continued movement of the main switch contact swings the contact 326 over against contact 327 and completes the circuit for the other heating element 73, whereby any air which may be circulating through the large conditioning unit will also be raised in temperature. The motor 58 of the large conditioning unit is connected with a contact 328 of the humidity control device H, a relay being interposed in this motor circuit if desired for handling the heavy current flow.

The operation of this embodiment is substantially as follows: The small conditioning unit C3 operates substantially constantly for the purpose of introducing a sufficient volume of outside air into the enclosure to maintain an interior pressure somewhat higher than atmospheric pressure, whereby to avoid infiltration of atmosphere into the enclosure through small openings therein. The large conditioning unit C4 only operates intermittently in accordance with the humidity regulation within the enclosure. If the humidity falls below a predetermined value, the humidity sensing apparatus H establishes a circuit through contact 328 and starts the motor 58 of this large unit operating. This results in a relatively large volume of air being drawn from the enclosure, circulated through said conditioning unit, and returned to the enclosure, and in passing through the unit the air is substantially saturated. If the humidity should rise above a predetermined value this same control apparatus completes a circuit through contact 324 and results in the air passing through the small unit C3 being lowered in humidity or temperature by cooling of the spray water therein or by other use of a refrigerant or source of cold.

At this time the large conditioning unit C4 is not operating, the motor 58 being inert because of the opening of its circuit at the contact 328. If the temperature should fall below a predetermined point, a circuit is established through contact 326 to energize the heating element 73' for raising the temperature of the entering air introduced through the unit C3. If this is not sufficient, a secondary circuit will be established through contact 327 to energize the other heating element 73 which will operate to heat any air which may be circulating through the large conditioning unit C4. If the temperature should rise above a predetermined point, a circuit is established through contact 323 to supply cold water or a refrigerant to the small conditioning unit C3 for reducing the temperature of the air being introduced into the enclosure.

This principle of introducing a sufficient volume of conditioned atmospheric air into the enclosure for preventing infiltration, and of conditioning the air within said enclosure by treatment within a large capacity, closed circuit conditioning unit, is capable of numerous adaptations to enclosures requiring different air conditions, and is characterized by the ability to effect a decided economy in equipment and operating expense due particularly to the relatively small refrigerating load necessary to its operation. Such can be best illustrated by assuming certain supposed values of temperature and humidity, which illustrate an improved method of adiabatic cooling which may be employed in certain adaptations.

For example, it will be assumed that the small conditioning unit C3 introduces air into the enclosure at a 70° saturated temperature. It will also be assumed that when the conditioning unit C4 starts operation the air drawn into such unit from the enclosure has a dry bulb temperature of 88 degrees, a dew point temperature of 74 degrees, and a wet bulb temperature of 78 degrees. It will be noted that there is no external control of the temperature of the spray water in the large conditioning unit, hence this spray water assumes the wet bulb temperature of the air. Such air, in passing through this conditioning unit, will be substantially saturated, with the result that its dry bulb, dew point and saturated temperatures will all be approximately 78 degrees when this air is re-circulated back into the enclosure. The adiabatic cooling effected in such unit is equal to the heat equivalent of the water evaporated between the change from a 74° dew point to a 78° dew point. Hence, by virtue of this adiabatic cooling occurring within the large conditioning unit C4, the refrigerating load imposed on the small conditioning unit C3 is greatly reduced. The relatively low temperature of the air introduced from this small conditioning unit C3 into the enclosure affords not only a comparatively dry cooling of the air handled by the unit C3, but also results in a larger adiabatic cooling in the unit C4. The above mode of conditioning can be obtained with either a fixed or a fluctuating dry bulb temperature in the enclosure X, depending upon whether a fixed thermostatic control or a fluctuating dew point control is used.

This principle is also adaptable to high humidity conditions within the enclosure, where the dry bulb temperature of the air entering the enclosure from the conditioning unit C3 is below the dew point required within the enclosure, as in cold storage plants. For example, it will be assumed that the air entering the enclosure from the unit C3 has a dry bulb temperature of 55 degrees and a dew point of 53 degrees, and that the desired conditions within the enclosure are approximately a 60° dry bulb temperature, a 58° wet bulb temperature, a 57° dew point, and a 90 per cent saturation. Under these conditions, there will be a cooling within the enclosure corresponding to the air supplied through unit C3 times the specific heat of air times the difference between interior and entering dry bulb temperatures (60 degrees minus 55 degrees) plus the water evaporated in unit C4 times the latent heat of evaporation. This cooling effected within the enclosure and the conditioning unit C4 greatly diminishes the refrigerating load which must be carried by the conditioning unit C3.

The principle is also adaptable to low humidity conditions where the humidity within the enclosure is relatively low, generally below that present in the outdoor atmosphere, and where the humidity in the enclosure is not subject to much rise. In such adaptation the small conditioning unit C3 will be provided with dehumidifying means such as the spray apparatus shown employing relatively cold spray water, or such as a chemical absorber, chilled surfaces, or the like.

In such arrangement, the dehumidifying action of the unit C3 will be subject to the control of the humidity controlling device H, whereby the air introduced into the enclosure by the unit C3 will be at a relatively low dew point. Moreover, in such arrangement, the spray apparatus S will be eliminated from the large conditioning unit C4 and such unit will have heating and cooling means characterized by dry surfaces. For example, the heater 73 may be employed for heating the air and a refrigerating coil 238' may be interposed in one of the air passes of the unit, substantially as described of Figure 2, for cooling the air. These heating and cooling devices will be under the control of the temperature controlling device T, substantially as hereinbefore described, so that the temperature in the enclosure will govern the operation of the heating device 73 and the cooling device 238'. In this manner the conditioning unit C4 will govern the temperature of the air within the enclosure without objectionably increasing the humidity of such air. In each of the above described adaptations wherein a separate conditioning unit supplies conditioned atmospheric air to the enclosure to prevent infiltration of unconditioned atmospheric air, the fan F of such conditioning unit may be operated constantly, or may be operated intermittently only to the amount required to maintain the desired pressure differential between the interior and the exterior of the enclosure.

I claim:

1. The method of incubation comprising: supporting a plurality of eggs within an enclosure, circulating a favorable air current through said enclosure by the following: introducing a stream of fresh air into the enclosure, introducing fresh air and maintaining pressure within the enclosure above the pressure outside thereof to produce an exfiltration of air therefrom, circulating a second stream of air to cause the same to move in a circuitous path within the enclosure and return to its source, each stream entering the chamber at a remote point from the other, and commingling said streams of air, supplying heat to one of said streams during a first portion of the incubating period, controlling said supply of heat to correspond to the requirements of the said portion of the incubating period, conditioning one of said streams of air with regard to humidity, controlling said conditioning in accordance with humidity requirements, supplying cooling fluid in heat exchange relation with the second stream of air during a second portion of the incubating period to remove heat from said air stream, and controlling said supply of fluid in accordance with requirements during said second portion of said incubating period.

2. The method of incubation comprising: supporting a plurality of eggs within an enclosure, circulating a favorable air current through said enclosure by the following: introducing a stream of fresh air into the enclosure, introducing fresh air and maintaining pressure within the enclosure above the pressure outside thereof to produce an exfiltration of air therefrom, circulating a second stream of air to cause the same to move in a circuitous path within the enclosure and return to its source, each stream entering the chamber at a remote point from the other, and commingling said streams of air, supplying heat to one of said streams during a first portion of the incubating period, controlling said supply of heat to correspond to the requirements of the said portion of the incubating period, conditioning one of said streams of air with regard to humidity, controlling said conditioning in accordance with humidity requirements, removing heat from the enclosure during the second portion of the incubating period by refrigerating the second stream of air, and controlling the refrigerating effect in accordance with requirements during the said second portion of the incubating period.

ROBERT B. P. CRAWFORD.